Oct. 7, 1924.
G. W. MOSER
GAS ENGINE PISTON
Filed March 26, 1924
1,511,135
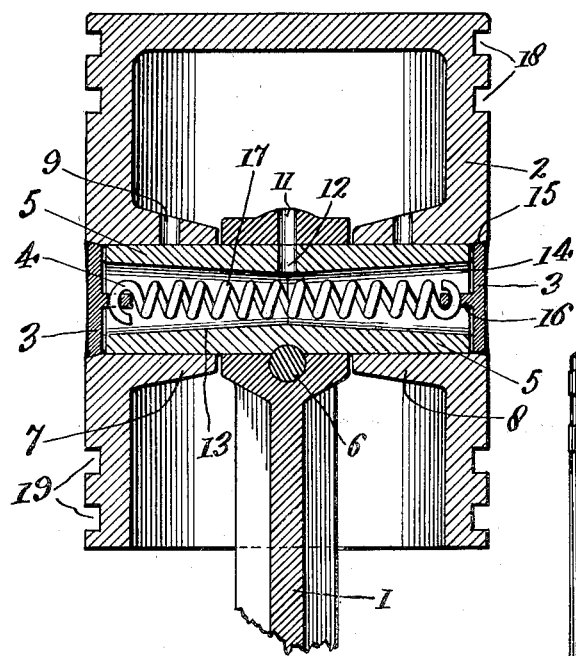
Fig. 1.
Fig. 3.
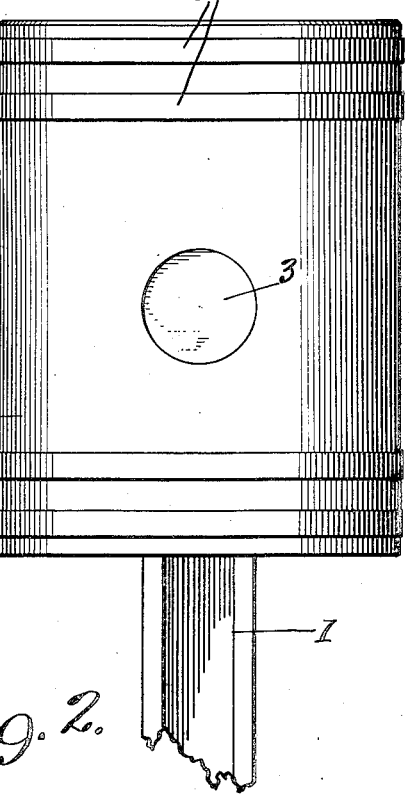
Fig. 2.
Inventor
G. W. Moser
by Wilkinson & Giusta
Attorneys.

Patented Oct. 7, 1924.

1,511,135

UNITED STATES PATENT OFFICE.

GEORGE W. MOSER, OF PERRYSBURG, OHIO.

GAS-ENGINE PISTON.

Application filed March 26, 1924. Serial No. 702,088.

*To all whom it may concern:*

Be it known that I, GEORGE W. MOSER, a citizen of the United States, residing at Perrysburg, in the county of Wood and State of Ohio, have invented certain new and useful Improvements in Gas-Engine Pistons; and I do hereby declare the following to be a full, clear, and exact description of the invention, such as will enable others skilled in the art to which it appertains to make and use the same.

The present invention relates to improvements in gas engine pistons, and more particularly relates to the construction of piston and wrist pins.

Ordinarily, in pistons as now constructed, a great deal of leakage of the compression occurs through the wrist pin, and it is the primary object of the present invention to afford a construction that will hold the compression and avoid the escape of this compression through and past the wrist pin in the crank case.

According to the invention, closure devices are provided at the ends of the openings in the piston provided to receive the wrist pin, such closure devices fit in tightly and being seated forcibly by the compression so as to avoid any passing of the gases into the opening.

Furthermore, the arrangement provides a means whereby the lower rings can be changed and possibly one used instead of two, but one or more rings may be used as deemed advisable under varying circumstances.

The invention also contemplates the better and more efficient lubrication of the wrist pin.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a vertical section taken through a piston constructed according to the present invention.

Figure 2 is a side view of the piston taken at right angles to Figure 1, and

Figure 3 is a fragmentary edge view of one of the discs and a portion of the spring.

Referring more particularly to the drawings 1 designates the connecting rod and 2 the piston which is provided in the usual manner with a transverse opening into which the wrist pin 5 is adapted to be fitted and held to the connecting rod as by the joining pin 6. In accordance with the usual custom, the piston is of a hollow construction and is provided with internal bosses 7 and 8 forming extended bearings for the wrist pin 5. The bosses are provided with oil ports 9 and 10 at their upper portions to permit of the splashing of the lubricant directly against the outside upper surface of the wrist pin 5, from which points the oil will flow along the wrist pin and down both sides thereof, thus effectively lubricating the pin in its bearings. In a similar way the connecting rod 1 or its cap piece is provided with a port 11 adapted to register with a similar port 12 made through the wrist pin 5 in order to direct lubricant into the hollow chamber within the wrist pin. The wrist pin is made cylindrical or substantially so with a true outer cylindrical wall, but on its interior the wrist pin wall is preferably composed of two conical sections 13 and 14, both tending toward a mutual central apex and both being truncated.

The outer ends of the hollow wrist pin 5 terminates short of the external wall of the piston 2 and at these end points of the transverse passage, the walls of the piston are bevelled as indicated at 15 to receive the complementally bevelled edges of the discs 3 by which an oil and compression tight fit is made. Each disc 3 is provided with a perforated internal lug 16, and a coil spring 17 has its ends engaged in the perforations of the two lugs. The spring is a tension spring and tends to draw the two discs together. This causes a binding of the bevelled edges against the walls 15 and the oil and compression cannot escape.

The piston is provided with the upper ring grooves 18, and the lower ring grooves 19, these ring grooves being above and below the wrist pin. One or more rings may be used above and below the wrist pin.

In the use of the device the piston 2 reciprocates in the usual manner while the connecting rod 1 and wrist pin 5 partake of an oscillating movement. The cranks splash oil up into the hollow piston 2 or oil may be fed up antomatically and this oil gets into the ports 9, 10 and 11 and lubricates the hollow wrist pin 5 both externally and internally and incidentally keeps the coil tension spring 13 well lubricated, so that it will not rust or crystallize and will constantly exert a strong pulling force upon the closure discs 3. The oil will be held against lateral escape from the ends of the wrist pin by the presence of the discs 3 and the discs it will be noted bind against the piston, but not against the wrist pin, so that they do not turn with the wrist pin and consequently there is no wear on the discs, and because of the fact that they do not undergo any movement themselves with respect to the piston, they are not apt to accidentally move off their seats or out of place such as to permit sporadic leaking of compression and oil.

The internal chamber of the wrist pin 5 constitutes a reservoir for holding a relatively large body of oil or other lubricant and this body of oil is forced during the rapidly reciprocating movement of the piston into the end spaces between the discs 3 and the end walls of the wrist pin 5, it being clearly shown in Figure 1 that spaces of rather large area are provided. The lubricant in this way is able to get up and enter the space between the external cylindrical wall of the wrist pin and the bearing bosses 7 and 8. An adequate and complete lubrication of the pin 5 results and losses due to friction and heat are kept down, and wear is minimized so that the life of the pin is prolonged.

The conical character of the walls 13 and 14 is such as to tend to move the lubricant out toward opposite ends of the wrist pin. The supply is at the center through the port 12 and consequently the lubricant tends to flow about in a closed cycle. The discs and spring may be added without great additional expense and the small alterations in the wrist pin and the piston may be arranged for without undue length in the time of manufacture and without great additional cost.

The discs 3 will be forced, by any compression leaking past the upper piston rings, against the bevelled seats 15, causing a tight fitting of the discs and avoiding the passing of this compression into the wrist pin or the space about the wrist pin. In other words, the disc 3 holds the compression in much the same way as piston rings, and only more effectively, as the compression acts directly against the outer face of the disc, and drives it at substantially right angles against its seat. With this device, losses in power in the motor due to escape of compression are minimized to a marked extent, so much so that double piston rings may be dispensed with, although the device may be very effectively used with one, two or more rings, both above and below the wrist pin.

It is obvious that various changes and modifications may be made in the details of construction and design of the above specifically described embodiment of this invention without departing from the spirit thereof, such changes and modifications being restricted only by the scope of the following claims.

What is claimed is:

1. A piston having a transverse opening with bevelled end walls and ported bearings inwardly of the bevelled end walls, a hollow wrist pin fitted to oscillate in said bearings and having its ends lying inwardly of said bevelled end walls, closure discs having bevelled edges fitted within said bevelled end walls without coming in contact with the ends of the hollow wrist pin, and a coil spring coupling said discs and passing through the hollow piston whereby to draw the two discs together.

2. A piston having a transverse opening with bevelled end walls and ported bearing bosses, a hollow wrist pin fitted to oscillate in said bosses and having its ends spaced inwardly from the bevelled end walls, said bearing bosses having lubricating ports, a connecting rod coupled to said hollow wrist pin, said connecting rod and writ pin having alining ports for introducing lubricant to the central portion of the pin, the inner wall of the pin being made up of two conical sections having their wider base portions at the ends of the pin, closure discs having bevelled edges fitted against the bevelled walls and provided with perforated lugs extending inwardly, a coil spring having its ends fitted in said perforated lugs, said spring being a tension spring for drawing the discs together, and ring grooves for the piston above and below said wrist pin.

3. A piston having a substantially transverse opening with bevelled end walls, a wrist pin fitted rotatably therein, a connecting rod coupled to said wrist pin, and discs yieldably drawn together and fitted in the ends of the opening, said discs having bevelled edges to fit against said bevelled ends of the opening whereby to be forcibly seated by the compression and preventing entrance of the compression into said opening.

GEORGE W. MOSER.